United States Patent
Hosokawa (10) Patent No.: US 7,965,321 B2
(45) Date of Patent: Jun. 21, 2011

(54) IMAGING DEVICE, IMAGING CONTROL METHOD, AND IMAGING CONTROL PROGRAM

(75) Inventor: Satoshi Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 365 days.

(21) Appl. No.: 12/160,657

(22) PCT Filed: Jan. 23, 2007

(86) PCT No.: PCT/JP2007/051014
§ 371 (c)(1),
(2), (4) Date: Jul. 11, 2008

(87) PCT Pub. No.: WO2007/086387
PCT Pub. Date: Aug. 2, 2007

(65) Prior Publication Data
US 2010/0231736 A1    Sep. 16, 2010

(30) Foreign Application Priority Data

Jan. 30, 2006  (JP) ................................ 2006-020713

(51) Int. Cl.
*H04N 5/228* (2006.01)
(52) U.S. Cl. ............... 348/222.1; 348/223.1; 348/224.1; 348/225.1; 348/362
(58) Field of Classification Search ............... 348/222.1, 348/223.1, 224.1, 225.1, 362
See application file for complete search history.

(56) References Cited

U.S. PATENT DOCUMENTS

| 5,467,129 | A | * | 11/1995 | Suzuki | .................. 348/231.6 |
| 6,018,362 | A | * | 1/2000 | Suzuki et al. | ............... 348/220.1 |
| 6,314,206 | B1 | * | 11/2001 | Sato | .............................. 382/235 |
| 2005/0264682 | A1 | * | 12/2005 | Kurane | ......................... 348/362 |
| 2007/0040914 | A1 | * | 2/2007 | Katagiri et al. | ............ 348/221.1 |

FOREIGN PATENT DOCUMENTS

| JP | 07177463 | A | 7/1995 |
| JP | 08181908 | A | 7/1996 |
| JP | 2001061148 | A | 3/2001 |
| JP | 2002209137 | A | 7/2002 |
| JP | 2003110924 | A | 4/2003 |

OTHER PUBLICATIONS

International Search Report for PCT/JP2007/051014 mailed Apr. 10, 2007.

* cited by examiner

*Primary Examiner* — Yogesh K Aggarwal (57) ABSTRACT

There is provided an imaging device capable of suppressing fluctuations in frame rate due to brightness of a subject's environment.

The imaging device includes: imaging units (1, 2) for taking an image of a subject, to acquire image data; a compression unit (3) for compression in frame units the image data acquired by the imaging units (1, 2); a light quantity information calculation unit (2) for calculating light quantity information including a shutter speed and a gain value, based on the image data acquired by the imaging units (1, 2); and compression ratio determination units (5, 6) for determining a compression ratio for compression in frame units by the compression unit (3), based on the light quantity information calculated by the light quantity information calculation unit (2), characterized in that the compression unit (3) compresses the image data in frame units based on the compression ratio determined by the compression ratio determination units (5, 6).

17 Claims, 5 Drawing Sheets

IMAGING DEVICE, IMAGING CONTROL METHOD, AND IMAGING CONTROL PROGRAM

TECHNICAL FIELD

The present invention relates to an imaging device, an imaging control method and an imaging control program, and particularly relates to an imaging device which takes an image of a subject to generate image data and compresses the generated image data, and an imaging control method and an imaging control program in the imaging device.

BACKGROUND ART

There has hitherto been a technique of changing a compression ratio for compressing image data in accordance with a noise amount or a complexity degree of the image data. However, since processing contents become complicated and image processing on the whole of an inputted image is required, load becomes high and hence the foregoing technique has been difficult to install.

Further, in the case of not installing the foregoing technique, fluctuations in code amount due to brightness of a subject's environment are marked. Therefore, even though a frame rate is held when the subject's environment is dark, the frame rate decreases markedly when the subject's environment is bright.

An output signal is feeble when the subject's environment is dark in a typical imaging element. Therefore such control as to set long signal input time in accordance with brightness of an input signal (shutter speed control) is generally performed.

It is to be noted that in the case of a camera sensor (imaging section) having a small area as installed in a communication terminal device such as a cell phone, an original signal is feeble, so that the signal input time widely fluctuates even in a normal photographic environment (e.g. outside, inside, etc.).

Further, in the communication terminal device, with its configuration highly susceptible to hand movement, the influence of the hand movement upon an image increases as the signal input time becomes longer. The hand movement is a contributing factor to image blurring, and consequently, when the subject's environment becomes dark, the degree of image blurring becomes significant.

As opposed to this, a video encoder for use in moving picture photographing, such as MPEG-4, H.263, is capable of transforming an image into a frequency region by DCT (discrete cosine transform) and then intentionally cutting off high frequency components that are contained in small amounts in a natural image, so as to realize a high compression ratio. Therefore, when an image is to be encoded while image quality is held at a given degree, in the case of an image having a large amount of high frequency components, it cannot be efficiently compressed and a code amount per frame becomes large, and on the contrary, in the case of an image having a small amount of high frequency components, only a small code amount per frame tends to be needed.

Figure 1:
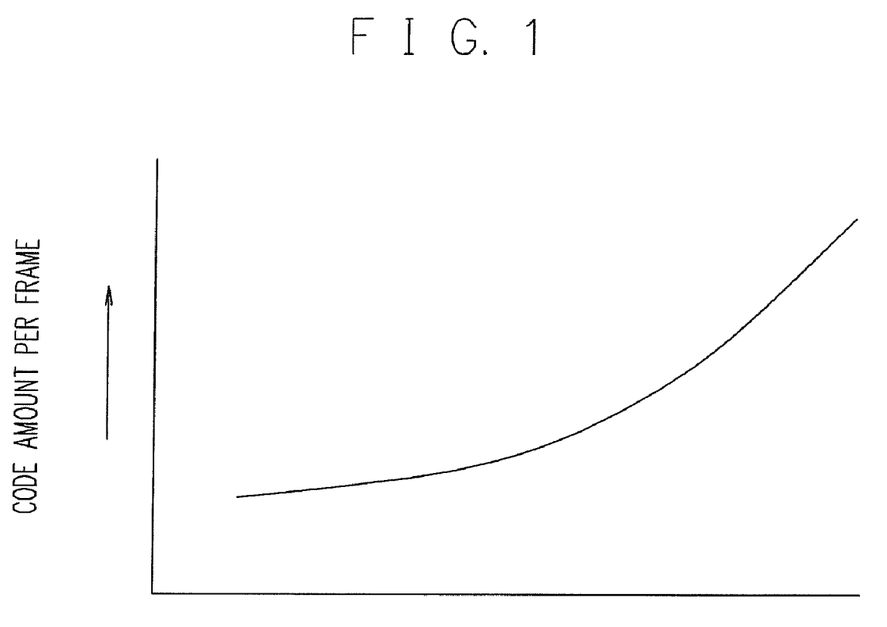
FIG. 1 is a view showing a correlation between brightness of a subject's environment and a code amount per frame in a video encoder.

It is revealed from the above that in photographing a moving picture with a communication terminal device, there is the correlation between the brightness of the subject's environment and the code amount per frame in the video encoder as shown in FIG. 1.

It is therefore desired to apply the correlation between the brightness of the subject's environment and the code amount per frame in the video encoder as shown in FIG. 1, and perform control so as to suppress fluctuations in frame rate due to the brightness of the subject's environment.

It is to be noted that there is a document as a patent document filed prior to the present invention, which discloses a still camera comprising: an imaging means for taking an image of a subject to output digital image data; an aperture means for controlling an amount of light incident to the imaging means; a data compression means for compressing the image data from the imaging means; and a recording medium for storing the image data compressed by the compression means, wherein a compression ratio control means is provided for controlling a compression ratio of the data compression means based on an aperture value of the aperture means, and in the case of automatically selecting a compression coefficient for data compression, the compression ratio can be selected with low power consumption at high speed (cf. e.g. Patent Document 1).

Patent Document 1: Japanese Patent Laid Open Publication No. H7-177463

DISCLOSURE OF THE INVENTION

It is to be noted that in Patent Document 1 mentioned above, the compression ratio of the data compression means is controlled based on the aperture value of the aperture means to allow selection of the compression ratio with low power consumption at high speed in the case of automatically selecting the compression coefficient for data compression, and Patent Document 1 does not taken into account the respect of applying the correlation between the brightness of the subject's environment and the code amount per frame in the video encoder to suppress fluctuations in frame rate due to the brightness of the subject's environment.

Means for Solving the Problem

The present invention was made in view of the above circumstances, and has an exemplary object to provide an imaging device, an imaging control method, and an imaging control program, which are capable of applying the correlation between the brightness of the subject's environment and the code amount per frame in the video encoder to suppress fluctuations in frame rate due to the brightness of a subject's environment.

In order to achieve such an exemplary object, the present invention includes the following characteristics.

An imaging device according to the present invention includes: an imaging unit that takes an image of a subject, to acquire image data; a compression unit that compresses in frame units the image data acquired by the imaging unit; a light quantity information calculation unit that calculates light quantity information including a shutter speed and a gain value, based on the image data acquired by the imaging unit; and a compression ratio determination unit that determines a compression ratio for compression in frame units by the compression unit, based on the light quantity information calculated by the light quantity information calculation unit, the device being characterized in that the compression unit compresses the image data in frame units based on the compression ratio determined by the compression ratio determination unit.

Moreover, an imaging control method according to the present invention is an imaging control method used in an imaging device including an imaging unit that takes an image of a subject to acquire image data, characterized in that the imaging device performs: a compression process for compressing in frame units the image data acquired by the imaging unit; a light quantity information calculation process for calculating light quantity information including a shutter speed and a gain value, based on the image data acquired by the imaging unit; and a compression ratio determination process for determining a compression ratio for compression in frame units by the compression process, based on the light quantity information calculated by the light quantity information calculation process, and the compression process compresses the image data in frame units based on the compression ratio determined by the compression ratio determination process.

Moreover, an imaging control program according to the present invention is an imaging control program executed in an imaging device including an imaging unit for taking an image of a subject to acquire image data, characterized in that the imaging device is made to execute: a compression process for compressing in frame units the image data acquired by the imaging unit; a light quantity information calculation process for calculating light quantity information including a shutter speed and a gain value, based on the image data acquired by the imaging unit; and a compression ratio determination process for determining a compression ratio for compression in frame units by the compression process, based on the light quantity information calculated by the light quantity information calculation process, and the compression process compresses the image data in frame units based on the compression ratio determined by the compression ratio determination process.

According to the present invention, by calculating light quantity information that includes a shutter speed and a gain value based upon image data acquired by the imaging unit, determining a compression ratio for compression in frame units based on the calculated light quantity information, and compressing the image data in frame units based on the determined compression ratio, it is possible to suppress fluctuations in frame rate due to the brightness of the subject's environment.

BEST MODE FOR CARRYING OUT THE INVENTION

First, a characteristic of an imaging device in the exemplary embodiment is described with reference to FIG. 2.

The imaging device in the exemplary embodiment includes: an imaging unit (corresponding to an imaging section 1 and an imaging control section 2) for taking an image of a subject, to acquire image data; a compression unit (corresponding to a video encoder section 3) for compressing in frame units the image data acquired by the imaging unit (1, 2); a light quantity information calculation unit (corresponding to the imaging control section 2) for calculating light quantity information including a shutter speed and a gain value, based on the image data acquired by the imaging unit (1, 2); and a compression ratio determination unit (corresponding to a parameter search processing section 5 and a parameter storage section 6) for determining a compression ratio for compression in frame units by the compression unit (3), based on the light quantity information calculated by the light quantity information calculation unit (2), characterized in that the compression means (3) compresses the image data in frame units based on the compression ratio determined by the compression ratio determination unit (5, 6). It is thereby possible to keep a code amount per frame at a given value regardless of brightness of a subject's environment, so as to suppress a frame skip caused by a shortage of a band and constantly hold a given frame rate. In the following, the imaging device in the exemplary embodiment is described with reference to attached drawings.

First, a configuration of the imaging device in the exemplary embodiment is described with reference to FIG. 2. It should be noted that FIG. 2 is a view showing the configuration of the imaging device in the exemplary embodiment.

Figure 2:
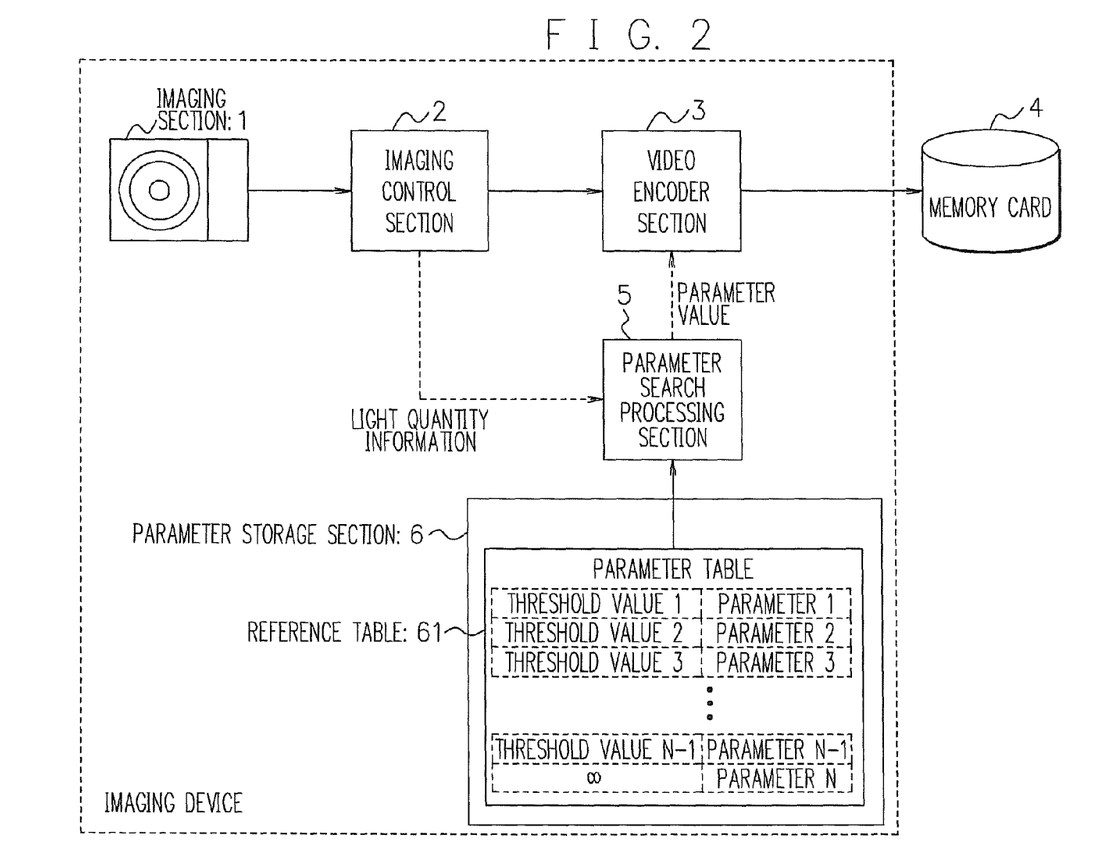
FIG. 2 is a view showing a configuration of an imaging device of the exemplary embodiment.

As shown in FIG. 2, the imaging device in the exemplary embodiment is configured including the imaging section 1, the imaging control section 2, the video encoder section 3, the memory card 4, the parameter search processing section 5, and the parameter storage section 6.

The imaging section 1 serves to take an image of imaging data for moving picture photographing, and outputs the imaging data taken by the imaging section 1 to the imaging control section 2.

The imaging control section 2 controls the imaging section 1, performs image processing on the imaging data outputted from the imaging control section 2, and outputs the imaging-processed image data to the video encoder section 3. It is to be noted that the imaging control section 2 is comprised of a signal processor such as a DSP (digital signal processor).

Further, the imaging control section 2 controls the imaging section 1, calculates light quantity information (shutter speed and gain value) of the imaging data outputted from the imaging section 1, and adjusts the shutter speed and the gain value of the imaging section 1 such that the brightness of the imaging data outputted from the imaging section 1 becomes an appropriate value.

The video encoder section 3 is an encoder such as MPEG-4, H.263. The video encoder section 3 is a generally used one, and comprised of dedicated hardware or the signal processor such as the DSP.

The parameter search processing section 5 acquires the light quantity information (shutter speed and gain value) calculated in the imaging control section 2, and determines an appropriate parameter value (compression ratio) to be set in the video encoder section 3 based on the acquired light quantity information. It should be noted that the parameter search processing section 5 can also be comprised of software.

The parameter storage section 6 serves to store a reference table 61 when the parameter search processing section 5 determines the parameter value. It is to be noted that the reference table 61 can also be configured as fixed data of software. In addition, the reference table 61 is configured including a plurality of columns of a parameter table formed by combination of threshold values and parameter values, and configured such that selection is made in increasing order of the threshold values.

The memory card 4 serves to store image data such as a video stream. It is to be noted that the memory card 4 can also be configured in a connection form such as the form of being inserted into a slot section (not shown) of the imaging device. Further, the memory card 4 can also be replaced by a non-volatile memory built in the imaging device.

(Control Operations in the Imaging Device)

Next, a Series of Control Operations in the Imaging Device in the exemplary embodiment is described with reference to FIG. 3.

First, the imaging section 1 takes an image of a subject, to acquire imaging data (Step S1). Next, the imaging section 1 outputs the acquired imaging data to the imaging control section 2. The imaging control section 2 performs image processing on the imaging data outputted from the imaging section 1, to generate image data (Step S2). Next, the imaging control section 2 outputs the generated image data to the video encoder section 3.

The video encoder section 3 performs compression processing on the image data outputted from the imaging control section 2 by codec algorithm such as MPEG-4, H.263 based on a parameter value (compression ratio) set by the parameter search processing section 5, to generate a video stream (Step S3). The video encoder section 3 then records the generated video stream in the memory card 4 (Step S4). It is to be noted that the foregoing series of control operations shown in FIG. 3 is performed in frame units, and the imaging device of the exemplary embodiment repeatedly performs the foregoing series of control operations shown in FIG. 3 in the frame units, to record a video stream of a given section in the memory card 4.

In addition, the imaging device in the exemplary embodiment constantly calculates light quantity information (shutter speed and gain value) of the imaging data outputted from the imaging section 1 during photographing, and the imaging control section 2 sets the calculated light quantity information (shutter speed and gain value) in the imaging section 1, thereby to constantly set optimum light quantity information (shutter speed and gain value) in the imaging section 1.

Next, search processing performed in the parameter search processing section 5 as a characteristic part of the imaging device of the exemplary embodiment is described with reference to FIG. 4.

Figure 3:
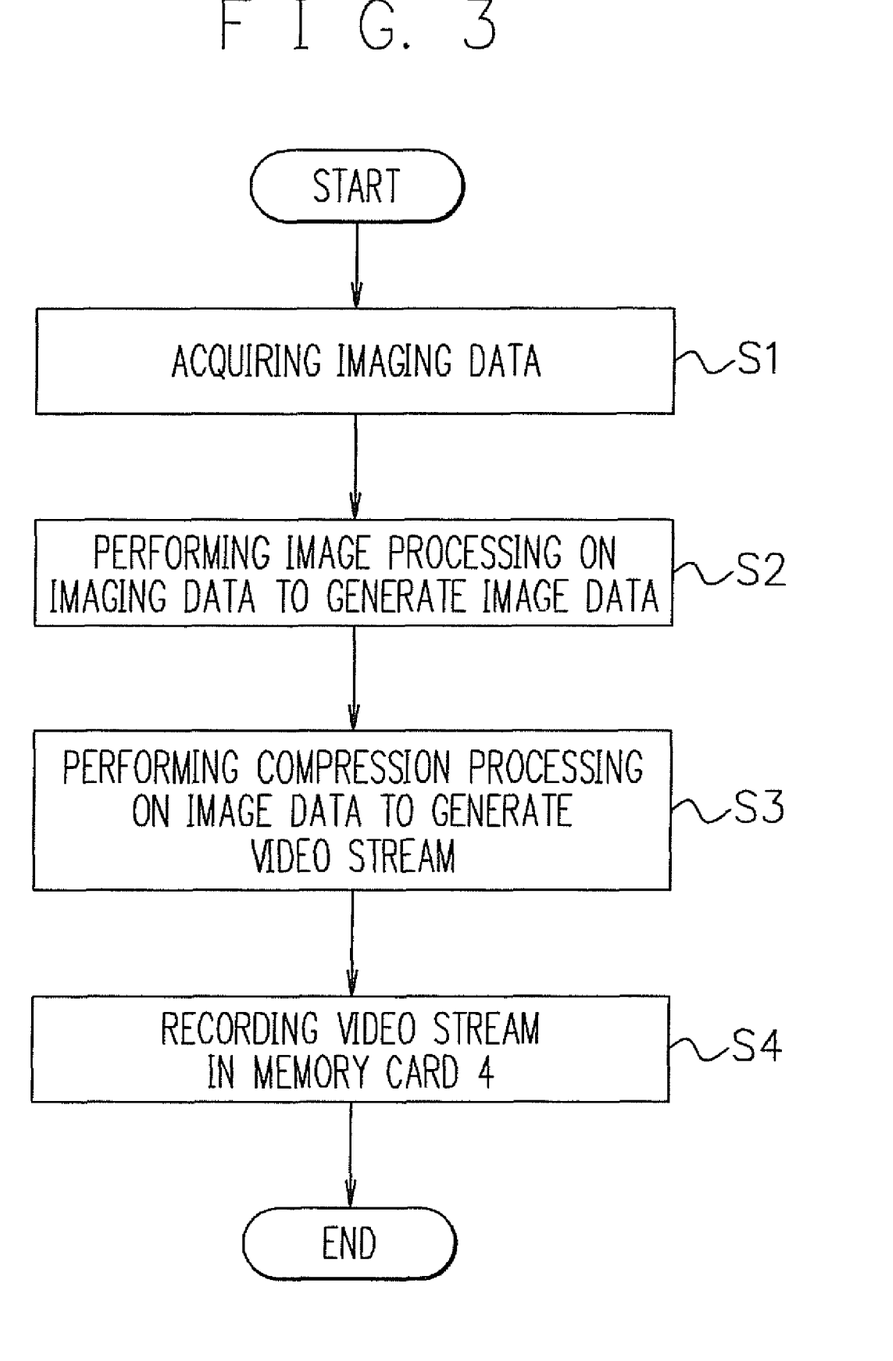
FIG. 3 is a view showing a series of control operations in the imaging device of the exemplary embodiment.
Figure 4:
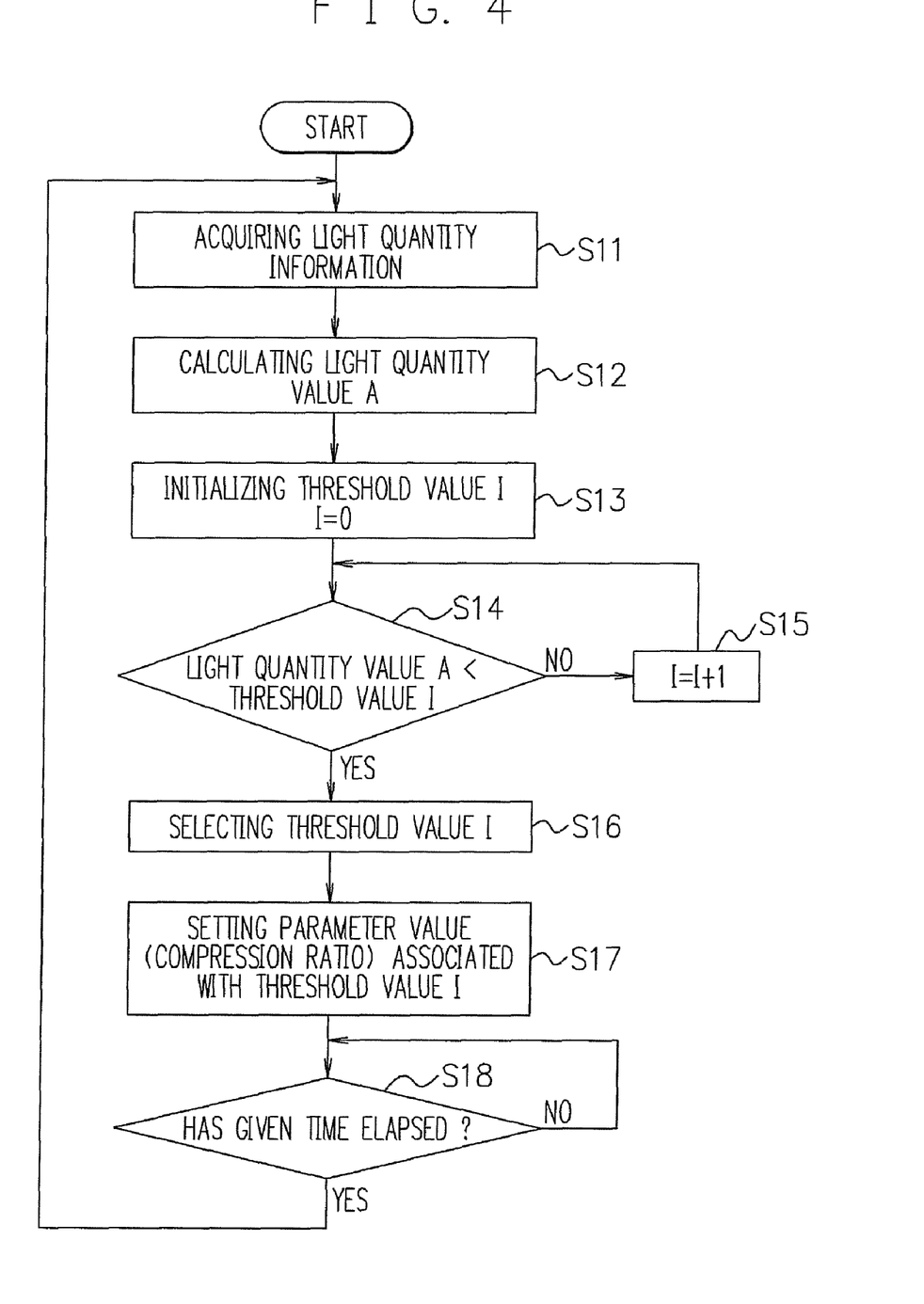
FIG. 4 is a view showing a series of processing operations in a parameter search processing section 5 comprising the imaging device of the exemplary embodiment.

At the imaging device in the exemplary embodiment, the parameter search processing section 5 performs a series of search processing shown in FIG. 4 in parallel with the foregoing series of control operations shown in FIG. 3.

First, the parameter search processing section 5 acquires the light quantity information (shutter speed and gain value) calculated in the imaging control section 2 (Step S11).

Next, the parameter search processing section 5 calculates a light quantity value based on the acquired light quantity information (Step S12) and references the reference table 61 stored in the parameter storage section 6 based on the calculated light quantity value, to determine an optimum parameter value (compression ratio) associated with a threshold value I suitable for the above calculated light quantity value (Steps S13 to S16).

It is to be noted that information corresponding to the brightness of the subject's environment is a function of the light quantity information. As for the light quantity information, there is a case where the only the one of the information exists for the imaging section 1, or there is a case where the gain value has been separated into two or more sections, such as an analog section and a digital section. In addition, in the case where the gain value has been separated into the two sections, the analog section and the digital section, two gain values, an analog gain value and a digital gain value, are obtained.

First, the parameter search processing section 5 calculates a light quantity value A by an appropriate calculation formula according to the imaging section 1 based on the light quantity information acquired from the imaging control section 2 (Step S12). It is to be noted that as the calculation formula for the light quantity value A, for example, "Calculation Formula 1" or "Calculation Formula 2" as follows can be applied.

Light quantity value $A$=shutter speed×gain value
(=analog gain value×digital gain value)    "Calculation Formula 1"

Light quantity value $A$=shutter speed+gain value
(=analog gain value+digital gain value)    "Calculation Formula 2"

Next, the parameter search processing section 5 initializes the threshold value 1 to 0 (Step S13), compares the light quantity value A calculated in Step S12 with the threshold value I (Step S14), and while adding 1 to the threshold value I each time until the light quantity value A calculated above becomes smaller than the threshold value I, the parameter search processing section 5 selects an optimum threshold value I from the reference table 61 stored in the parameter storage section 6 (Steps S14 to S16).

It should be noted that, since the reference table 61 is configured in increasing order of the threshold values I, the threshold value I ultimately selected in Step S16 is one larger than the light quantity value A calculated in Step S12 above ("light quantity value A<threshold value I") and closest to the above calculated light quantity value A.

Next, the parameter search processing section 5 acquires a parameter value associated with the above selected threshold value I from the reference table 61, and sets the acquired parameter value in the video encoder section 3 (Step S17).

Next, when determining that given time has elapsed (Step S18/Yes), the parameter search processing section 5 returns the processing to Step S1, and repeats the series of search processing shown in FIG. 4. In addition, the given time as waiting time can be arbitrarily set, and is desirably set on the order of 1/30 second to two seconds.

As thus described, the imaging device in the exemplary embodiment performs the series of parameter search processing shown in FIG. 4 to determine the optimum parameter value (compression ratio) in accordance with constantly varying brightness of the subject's environment, so as to set the determined parameter value (compression ratio) in the video encoder section 6.

Figure 5:
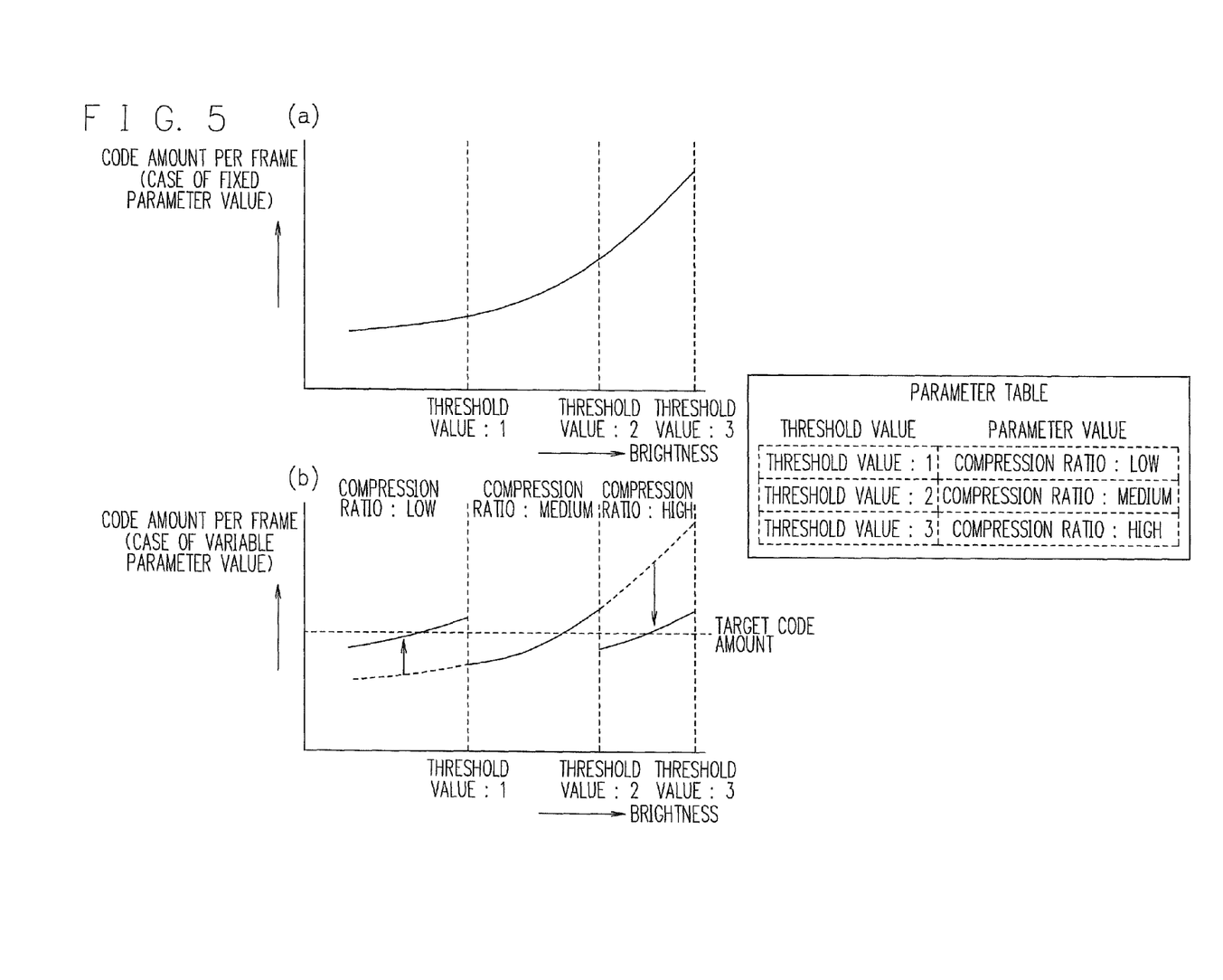
FIG. 5 is a view showing the correlation between the brightness of the subject's environment and the code amount per frame, (a) shows the case of conventional control operations with a parameter value (compression ratio) in fixed control, and (b) shows the case of control operations of the exemplary embodiment with a parameter value (compression ratio) in variable control.

It should be noted that, as an actual parameter value (compression ratio), a lower parameter value (compression ratio) (value with high frequency components being uncut) is set in a darker region and a higher parameter value (compression ratio) (value with high frequency components being cut) is set in a brighter region, as shown in FIG. 5(*b*). Accordingly, although the code amount per frame fluctuates due to the brightness of the subject's environment in the conventional case because of a fixed parameter value (compression ratio) as shown in FIG. 5(*a*), it is possible as in the control operations of the exemplary embodiment to hold the code amount per frame at a given value irrespective of the brightness of the subject's environment by controlling the parameter value so as to make the value fluctuate based on the light quantity information calculated in the imaging control section 2 as shown in FIG. 5(*b*).

As thus described, in the imaging device in the exemplary embodiment, it is possible to hold the code amount per frame at a given value irrespective of the brightness of the subject's environment by changing the parameter value (compression ratio) which is to be set in the video encoder section 6 based on the light quantity information (shutter speed and gain value) calculated in the imaging control section 2, as shown in FIG. 5(*b*). It is thereby possible to suppress frame skip caused by a shortage of a band, and constantly hold a given frame rate.

Further, in the imaging device in the exemplary embodiment, it is possible to determine the optimum parameter value based on the reference table 61 stored in the parameter storage section 6, so as to execute the series of processing operations shown in FIG. 4 through the use of spare time of an existing CPU or the like. Further, since addition of complicated control to the video encoder section 3 is not necessary, it is possible to realize the imaging device in the exemplary embodiment at low cost.

Further, an exemplary embodiment of the invention is the imaging device including: a light quantity value calculation unit that calculates a light quantity value for determination of the compression ratio, based on the light quantity information; and a reference table for managing a threshold value and the compression ratio by association with each other, the device being characterized in that a threshold value suitable for the light quantity value calculated by the light quantity value calculation unit is selected, the reference table is referenced based on the selected threshold value, a compression ratio associated with the threshold value suitable for the light quantity value is acquired, and a compression ratio for compression in frame units by the compression unit is determined.

Further, an exemplary embodiment of the invention is the imaging device characterized in that the light quantity value calculation unit calculates the light quantity value A by: light quantity value A=shutter speed×gain value.

Further, an exemplary embodiment of the invention is the imaging device characterized in that the light quantity value calculation means calculates the light quantity value A by: light quantity value A=shutter speed+gain value.

Further, an exemplary embodiment of the invention is the imaging device characterized in that the reference table manages the threshold value and the compression ratio by association with each other in increasing order of the threshold values, and the light quantity value calculated by the light quantity value calculation unit is compared with the threshold value managed by the reference table in increasing order of the threshold values, and when the light quantity value calculated by the light quantity value calculation unit is determined to be smaller than the threshold value, the threshold value is selected as the threshold value suitable for the light quantity value calculated by the light quantity value calculation unit.

Further, an exemplary embodiment of the invention is the imaging device characterized in that the light quantity value calculation unit calculates the light quantity value A by: light quantity value A=shutter speed×gain value (analog value×digital gain value) in a case where the light quantity information includes two gain values, that is, an analog gain value and a digital gain value.

Further, an exemplary embodiment of the invention is the imaging device characterized in that the light quantity value calculation unit calculates the light quantity value A by: light quantity value A=shutter speed+gain value (analog gain value+digital gain value) in a case where the light quantity information includes two gain values, that is, an analog gain value and a digital gain value.

Further, an exemplary embodiment of the invention is the imaging device characterized in that the imaging unit controls a shutter speed and a gain value based on the light quantity information calculated by the light quantity information calculation unit, to take an image of the object to be photographed.

Further, an exemplary embodiment of the invention is the imaging control method characterized in that the imaging device includes a reference table for managing a threshold value and the compression ratio by association with each other, the imaging device performs a light quantity value calculation process for calculating a light quantity value for determination of the compression ratio, based on the light quantity information, and a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined.

Further, an exemplary embodiment of the invention is the imaging control method characterized in that the light quantity value calculation process calculates the light quantity value A by: light quantity value A=shutter speed×gain value.

Further, an exemplary embodiment of the invention is the imaging control method characterized in that the light quantity value calculation process calculates the light quantity value A by: light quantity value A=shutter speed+gain value.

Further, an exemplary embodiment of the invention is the imaging control method characterized in that the reference table manages the threshold value and the compression ratio by association with each other in increasing order of the threshold values, and the light quantity value calculated by the light quantity value calculation process is compared with the threshold value managed by the reference table in increasing order of the threshold values, and when the light quantity value calculated by the light quantity value calculation process is determined to be smaller than the threshold value, the threshold value is selected as the threshold value suitable for the light quantity value calculated by the light quantity value calculation process.

Further, an exemplary embodiment of the invention is the imaging control method s characterized in that the light quantity value calculation process calculates the light quantity value A by: light quantity value A=shutter speed×gain value (analog gain value×digital gain value) in a case where the light quantity information includes two gain values, that is, an analog gain value and a digital gain value.

Further, an exemplary embodiment of the invention is the imaging control method characterized in that the light quantity value calculation process calculates the light quantity value A by: light quantity value A=shutter speed+gain value (analog gain value+digital gain value) in a case where the light quantity information includes two gain values, that is, an analog gain value and a digital gain value.

Further, an exemplary embodiment of the invention is the imaging control program characterized in that the imaging device includes a reference table for managing a threshold value and the compression ratio by association with each other, the imaging device is made to execute a light quantity value calculation process for calculating a light quantity value for determination of the compression ratio, based on the light quantity information, and a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined.

Further, an exemplary embodiment of the invention is the imaging control program characterized in that the light quantity value calculation process calculates the light quantity value A by: light quantity value A=shutter speed×gain value.

Further, an exemplary embodiment of the invention is the imaging control program characterized in that the light quantity value calculation process calculates the light quantity value A by: light quantity value A=shutter speed+gain value.

Further, an exemplary embodiment of the invention is the imaging control program characterized in that the reference table manages the threshold value and the compression ratio by association with each other in increasing order of the threshold values, and the light quantity value calculated by the light quantity value calculation process is compared with the threshold value managed by the reference table in increasing order of the threshold values, and when the light quantity value calculated by the light quantity value calculation process is determined to be smaller than the threshold value, the threshold value is selected as the threshold value suitable for the light quantity value calculated by the light quantity value calculation process.

Further, an exemplary embodiment of the invention is the imaging control program characterized in that the light quantity value calculation process calculates the light quantity value A by: light quantity value A=shutter speed×gain value (analog gain value×digital gain value) in a case where the light quantity information includes two gain values, that is, an analog gain value and a digital gain value.

Further, an exemplary embodiment of the invention is the imaging control program characterized in that the light quantity value calculation process calculates the light quantity value A by: light quantity value A=shutter speed+gain value (analog gain value+digital gain value) in a case where the light quantity information includes two gain values, that is, an analog gain value and a digital gain value.

In addition, the foregoing exemplary embodiment is a preferred exemplary embodiment of the present invention, to which the scope of the present invention is not limited, and the present invention can be implemented in a mode with a variety of modifications made thereon in a scope not deviating from the gist of the present invention.

Although the foregoing series of processing operations in the imaging device determine the optimum parameter value (compression ratio) based on the light quantity information calculated on the basis of imaging data taken in the imaging section 1 and compress the image data based on the determined parameter value (compression ratio), it is also possible, for example, to apply the foregoing control operations to upward video processing of an imaging device installed with a picture-phone function.

Moreover, it is possible to execute the foregoing control operations in the imaging device of the exemplary embodiment not in the hardware configuration but by software such as a computer program, and it is also possible to record the above program in an optical recording medium, a magnetic recording medium, a magneto-optical recording medium, or a recording medium of a semiconductor or the like and make an imaging device capable of forming a video image read the above program from the recording medium, so as to execute the foregoing control operations in the imaging device. It is further possible to make the imaging device read the above program from an external device connected thereto through a prescribed network, so as to execute the foregoing control operations in the imaging device.

INDUSTRIAL APPLICABILITY

The imaging device, imaging control method and the imaging control program according to the present invention are applicable to imaging devices installed with a camera function or a picture-phone function, such as a PHS and a cell phone.

DESCRIPTION OF SYMBOLS

1 Imaging section
2 Imaging control section
3 Video encoder section
4 Memory card
5 Parameter search processing section
6 Parameter storage section
61 Reference table

The invention claimed is:

1. An imaging device, comprising:
an imaging unit that takes an image of a subject, to acquire image data;
a compression unit that compresses in frame units the image data acquired by the imaging unit;
a light quantity information calculation unit that calculates light quantity information including a shutter speed and a gain value, based on the image data acquired by the imaging unit;
a compression ratio determination unit that determines a compression ratio for compression in frame units by the compression unit, based on the light quantity information calculated by the light quantity information calculation unit;
a light quantity value calculation unit that calculates a light quantity value for determination of the compression ratio, based on the light quantity information; and
a reference table for managing a threshold value and the compression ratio by association with each other,
characterized in that:
the compression unit compresses the image data in frame units based upon the compression ratio determined by the compression ratio determination unit,
a threshold value suitable for the light quantity value calculated by the light quantity value calculation unit is selected,
the reference table is referenced based on the selected threshold value,
a compression ratio associated with the threshold value suitable for the light quantity value is acquired,
a compression ratio for compression in frame units by the compression unit is determined, and
the light quantity value calculation unit calculates the light quantity value A by: light quantity value A=shutter speed×gain value.

2. The imaging device according to claim 1, characterized in that the light quantity value calculation unit calculates the light quantity value A by: light quantity value A=shutter speed×gain value (analog gain value×digital gain value) in a case where the light quantity information includes two gain values, that is, an analog gain value and a digital gain value.

3. The imaging device according to claim 1, characterized in that the imaging unit controls a shutter speed and a gain value based on the light quantity information calculated by the light quantity information calculation unit, to take an image of the object to be photographed.

4. An imaging device, comprising:
an imaging unit that takes an image of a subject, to acquire image data;
a compression unit that compresses in frame units the image data acquired by the imaging unit;
a light quantity information calculation unit that calculates light quantity information including a shutter speed and a gain value, based on the image data acquired by the imaging unit;
a compression ratio determination unit that determines a compression ratio for compression in frame units by the compression unit, based on the light quantity information calculated by the light quantity information calculation unit;
a light quantity value calculation unit that calculates a light quantity value for determination of the compression ratio, based on the light quantity information; and
a reference table for managing a threshold value and the compression ratio by association with each other, characterized in that:
the compression unit compresses the image data in frame units based upon the compression ratio determined by the compression ratio determination unit,
a threshold value suitable for the light quantity value calculated by the light quantity value calculation unit is selected,
the reference table is referenced based on the selected threshold value,
a compression ratio associated with the threshold value suitable for the light quantity value is acquired,
a compression ratio for compression in frame units by the compression unit is determined, and
the light quantity value calculation unit calculates the light quantity value A by: light quantity value A=shutter speed+gain value.

5. The imaging device according to claim 4, characterized in that the light quantity value calculation unit calculates the light quantity value A by: light quantity value A=shutter speed+gain value (analog gain value+digital gain value) in a case where the light quantity information includes two gain values, that is, an analog gain value and a digital gain value.

6. An imaging device, comprising:
an imaging unit that takes an image of a subject, to acquire image data;
a compression unit that compresses in frame units the image data acquired by the imaging unit;
a light quantity information calculation unit that calculates light quantity information including a shutter speed and a gain value, based on the image data acquired by the imaging unit;
a compression ratio determination unit that determines a compression ratio for compression in frame units by the compression unit, based on the light quantity information calculated by the light quantity information calculation unit;
a light quantity value calculation unit that calculates a light quantity value for determination of the compression ratio, based on the light quantity information; and
a reference table for managing a threshold value and the compression ratio by association with each other, characterized in that:
the compression unit compresses the image data in frame units based upon the compression ratio determined by the compression ratio determination unit,
a threshold value suitable for the light quantity value calculated by the light quantity value calculation unit is selected,
the reference table is referenced based on the selected threshold value,
a compression ratio associated with the threshold value suitable for the light quantity value is acquired,
a compression ratio for compression in frame units by the compression unit is determined,
the reference table manages the threshold value and the compression ratio by association with each other in increasing order of the threshold values, and
the light quantity value calculated by the light quantity value calculation unit is compared with the threshold value managed by the reference table in increasing order of the threshold values, and when the light quantity value calculated by the light quantity value calculation unit is determined to be smaller than the threshold value, the threshold value is selected as the threshold value suitable for the light quantity value calculated by the light quantity value calculation unit.

7. An imaging control method used in an imaging device comprising an imaging means for taking an image of a subject to acquire image data, characterized in that
(a) the imaging device performs:
a compression process for compression in frame units the image data acquired by the imaging unit;
a light quantity information calculation process for calculating light quantity information including a shutter speed and a gain value, based on the image data acquired by the imaging means; and
a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device includes a reference table for managing a threshold value and the compression ratio by association with each other;
(d) the imaging device performs a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined; and
(f) the light quantity value calculation process calculates the light quantity value A by: light quantity value A=shutter speed×gain value.

8. The imaging control method according to claim 7, characterized in that the light quantity value calculation process calculates the light quantity value A by: light quantity value A=shutter speed×gain value (analog gain value×digital gain value) in a case where the light quantity information includes two gain values, that is, an analog gain value and a digital gain value.

9. An imaging control method used in an imaging device comprising an imaging means for taking an image of a subject to acquire image data, characterized in that (a) the imaging device performs:
  a compression process for compression in frame units the image data acquired by the imaging unit;
  a light quantity information calculation process for calculating light quantity information including a shutter speed and a gain value, based on the image data acquired by the imaging means; and
  a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device includes a reference table for managing a threshold value and the compression ratio by association with each other;
(d) the imaging device performs a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined; and
(f) the light quantity value calculation process calculates the light quantity value A by: light quantity value A=shutter speed+gain value.

10. The imaging control method according to claim 9, characterized in that the light quantity value calculation process calculates the light quantity value A by: light quantity value A=shutter speed+gain value (analog gain value+digital gain value) in a case where the light quantity information includes two gain values, that is, an analog gain value and a digital gain value.

11. An imaging control method used in an imaging device comprising an imaging means for taking an image of a subject to acquire image data, characterized in that
(a) the imaging device performs:
  a compression process for compression in frame units the image data acquired by the imaging unit;
  a light quantity information calculation process for calculating light quantity information including a shutter speed and a gain value, based on the image data acquired by the imaging means; and
  a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device includes a reference table for managing a threshold value and the compression ratio by association with each other;
(d) the imaging device performs a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined;
(f) the reference table manages the threshold value and the compression ratio by association with each other in increasing order of the threshold values; and
(g) the light quantity value calculated by the light quantity value calculation process is compared with the threshold value managed by the reference table in increasing order of the threshold values, and when the light quantity value calculated by the light quantity value calculation process is determined to be smaller than the threshold value, the threshold value is selected as the threshold value suitable for the light quantity value calculated by the light quantity value calculation process.

12. A non-transitory computer-readable medium for storing a imaging control program executed in an imaging device comprising an imaging unit for taking an image of a subject to acquire image data,
characterized in that:
(a) the imaging device is made to execute:
  a compression process for compression in frame units the image data acquired by the imaging unit;
  a light quantity information calculation process for calculating light quantity information including a shutter speed and a gain value, based on the image data acquired by the imaging unit; and
  a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device comprises a reference table for managing a threshold value and the compression ratio by association with each other;
(d) the imaging device is made to execute a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined; and
(f) the light quantity value calculation process calculates the light quantity value A by: light quantity value A=shutter speed×gain value.

13. The storing medium for storing the imaging control program according to claim 12, characterized in that the light quantity value calculation process calculates the light quantity value A by: light quantity value A=shutter speed×gain value (analog gain value×digital gain value) in a case where the light quantity information includes two gain values, that is, an analog gain value and a digital gain value.

14. A non-transitory computer-readable medium for storing a imaging control program executed in an imaging device comprising an imaging unit for taking an image of a subject to acquire image data, characterized in that:
(a) the imaging device is made to execute:
a compression process for compression in frame units the image data acquired by the imaging unit;
a light quantity information calculation process for calculating light quantity information including a shutter speed and a gain value, based on the image data acquired by the imaging unit; and
a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device comprises a reference table for managing a threshold value and the compression ratio by association with each other;
(d) the imaging device is made to execute a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined; and
(f) the light quantity value calculation process calculates the light quantity value A by: light quantity value A=shutter speed+gain value.

15. The storing medium for storing the imaging control program according to claim 14, characterized in that the light quantity value calculation process calculates the light quantity value A by: light quantity value A=shutter speed+gain value (analog gain value+digital gain value) in a case where the light quantity information includes two gain values, that is, an analog gain value and a digital gain value.

16. A non-transitory computer-readable medium for storing a imaging control program executed in an imaging device comprising an imaging unit for taking an image of a subject to acquire image data,
characterized in that:
(a) the imaging device is made to execute:
a compression process for compression in frame units the image data acquired by the imaging unit;
a light quantity information calculation process for calculating light quantity information including a shutter speed and a gain value, based on the image data acquired by the imaging unit; and
a compression ratio determination process for determining a compression ratio for compression in frame units by the compression process, based on the light quantity information calculated by the light quantity information calculation process;
(b) the compression process compresses the image data in frame units based on the compression ratio determined by the compression ratio determination process;
(c) the imaging device comprises a reference table for managing a threshold value and the compression ratio by association with each other;
(d) the imaging device is made to execute a light quantity value calculation process for calculating a light quantity value for determination of the compression ratio, based on the light quantity information;
(e) a threshold value suitable for the light quantity value calculated by the light quantity value calculation process is selected, the reference table is referenced based on the selected threshold value, a compression ratio associated with the threshold value suitable for the light quantity value is acquired, and a compression ratio for compression in frame units by the compression process is determined;
(f) the reference table manages the threshold value and the compression ratio by association with each other in increasing order of the threshold values; and
(g) the light quantity value calculated by the light quantity value calculation process is compared with the threshold value managed by the reference table in increasing order of the threshold values, and when the light quantity value calculated by the light quantity value calculation process is determined to be smaller than the threshold value, the threshold value is selected as the threshold value suitable for the light quantity value calculated by the light quantity value calculation process.

17. An imaging device, comprising:
imaging means for taking an image of a subject, to acquire image data;
compression means for compressing in frame units the image data acquired by the imaging means;
light quantity information calculation means for calculating light quantity information including a shutter speed and a gain value, based on the image data acquired by the imaging means;
compression ratio determination means for determining a compression ratio for compression in frame units by the compression means, based on the light quantity information calculated by the light quantity information calculation means;
light quantity value calculation means for calculating a light quantity value for determination of the compression ratio, based on the light quantity information; and
a reference table for managing a threshold value and the compression ratio by association with each other,
characterized in that:
the compression means compresses the image data in frame units based upon the compression ratio determined by the compression ratio determination means,
a threshold value suitable for the light quantity value calculated by the light quantity value calculation means is selected,
the reference table is referenced based on the selected threshold value,
a compression ratio associated with the threshold value suitable for the light quantity value is acquired,
a compression ratio for compression in frame units by the compression means is determined, and
the light quantity value calculation means calculates the light quantity value A by: light quantity value A=shutter speed×gain value.

* * * * *